(12) United States Patent
Cohen et al.

(10) Patent No.: US 7,756,811 B2
(45) Date of Patent: Jul. 13, 2010

(54) AGENDA AWARENESS IN A COMMUNICATION CLIENT

(75) Inventors: Gabriel Aaron Cohen, Durham, NC (US); Michael Dennis Facemire, Pittsboro, NC (US); Travis M. Grigsby, Austin, TX (US); Thomas Richard Haynes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/639,499

(22) Filed: Dec. 14, 2006

(65) Prior Publication Data

US 2008/0147733 A1 Jun. 19, 2008

(51) Int. Cl.
*G06F 17/30* (2006.01)
(52) U.S. Cl. .......................................... 707/6
(58) Field of Classification Search ................. 707/3, 707/6, 10
See application file for complete search history.

(56) References Cited

U.S. PATENT DOCUMENTS

| | | | |
|---|---|---|---|
| 6,134,548 A * | 10/2000 | Gottsman et al. | 707/5 |
| 6,311,191 B1 | 10/2001 | Retallick | |
| 6,442,567 B1 | 8/2002 | Retallick et al. | |
| 6,507,845 B1 | 1/2003 | Cohen et al. | |
| 6,925,603 B1 | 8/2005 | Naito et al. | |
| 2003/0069759 A1 | 4/2003 | Smith | |
| 2005/0138631 A1* | 6/2005 | Bellotti et al. | 719/310 |
| 2005/0267770 A1 | 12/2005 | Banavar et al. | |
| 2006/0047644 A1* | 3/2006 | Bocking et al. | 707/4 |
| 2006/0106846 A1 | 5/2006 | Schulz et al. | |

OTHER PUBLICATIONS http://voo2do.com/help/features <retrieved on Jul. 14, 2006>.
http://voo2do.com/collab <retrieved on Jul. 14, 2006>.
http://www.chaossoftware.com/chaos.asp <retrieved on Jul. 14, 2006>.
Method and Structure for Agenda Based Scheduling Using Sub-events, Jones et al., Jun. 30, 2005 (Co-pending Application).

* cited by examiner

*Primary Examiner*—Baoquoc N To
(74) *Attorney, Agent, or Firm*—Steven E. Bach

(57) ABSTRACT

A method is provided for promoting agenda awareness in a communication client. A system user's agenda of tasks with associated contact information is provided to the communication client. Matches are sought between the associated contact information from the agenda and a contact in a contact list in the communication client. Contacts matching the associated contact information and the tasks associated with the contact information are presented at a user interface.

21 Claims, 6 Drawing Sheets

AGENDA AWARENESS IN A COMMUNICATION CLIENT

BACKGROUND

In the business environment and in the personal environment, there is an increasing drive to improve efficiency and productivity while handling an ever-increasing volume of communication and flow of information. One example of this is the management of tasks through the use and organization of a todo list. In at least one reference, it is recommended that tasks be inserted onto a personal calendar and associated with a context.

While a list of tasks to be performed on a personal calendar and organizing tasks by context may enhance productivity, the time overhead required to access the personal calendar, enter the appropriate communication client, collaborate with a contact, and update the personal calendar may offset the efficiency gains. Also, when out of the office, a communication client user might have his/her communication client (e.g., a cell phone or IM client), but not his/her personal calendar, which may be resident in a desktop computer in his/her office.

When a communication client user looks at his/her communication client, an extensive list of contacts is presented, from which it is difficult to determine at a glance whom it would be useful to contact. Contacts with whom there is no need to collaborate are given equal prominence with contacts with whom it would be useful to communicate. For example, one might keep a running list of items to discuss with his/her manager when the opportunity occurs to communicate with the manager. However, if one finds himself/herself with a few minutes before a meeting while using a communication client, it is not easy to determine that he/she has discussion points for the manager, let alone what those discussion points are.

SUMMARY

The invention provides a system, method, and program product for promoting agenda awareness in a communication client. A system user's agenda of tasks with associated contact information is provided to the communication client. The system searches for matches between the associated contact information from the agenda and contacts in a contact list in the communication client. Contacts matching the associated contact information and the tasks associated with the contact information are presented at a user interface.

The invention promotes awareness in a communication client of agenda items or tasks requiring collaboration. Contacts in a contact list with whom collaborative agenda items are proposed are flagged or segregated under task type headings. Thus, a communication client user can see in a glance those contacts with whom collaboration is useful, and easily determine the nature of collaboration proposed.

Moreover, an exemplary embodiment of the invention enables the communication client user to remove agenda items and flags from their contact list either at the contact list or during a communication session.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

The invention provides a process for promoting agenda awareness in a communications client. Agenda items, such as: open discussion items, upcoming meetings, reporting requirements, etc., are provided to a communication client with associated contact information. The contact information may be an individual with whom the discussion item is open, such as a person from whom information is needed, or a person with whom a meeting needs to be scheduled. In one exemplary embodiment, the contact information may be an area of expertise or responsibility pertaining to the agenda item. The system looks up the contacts associated with the agenda items and marks those contacts associated with agenda items in a contact display at a user interface screen of the communication client.

Typically, communication clients, such as an e-mail utility on a computer, or a mobile phone, will have a contact list resident on the client. This contact list may be structured in a variety of ways within the scope of the invention. In an exemplary embodiment, the contact list will present a collection of contact names selectable from the contact list. Moreover, as will be described hereafter, a variety of flags or marks and corresponding status may be associated with the contacts.

Figure 1:
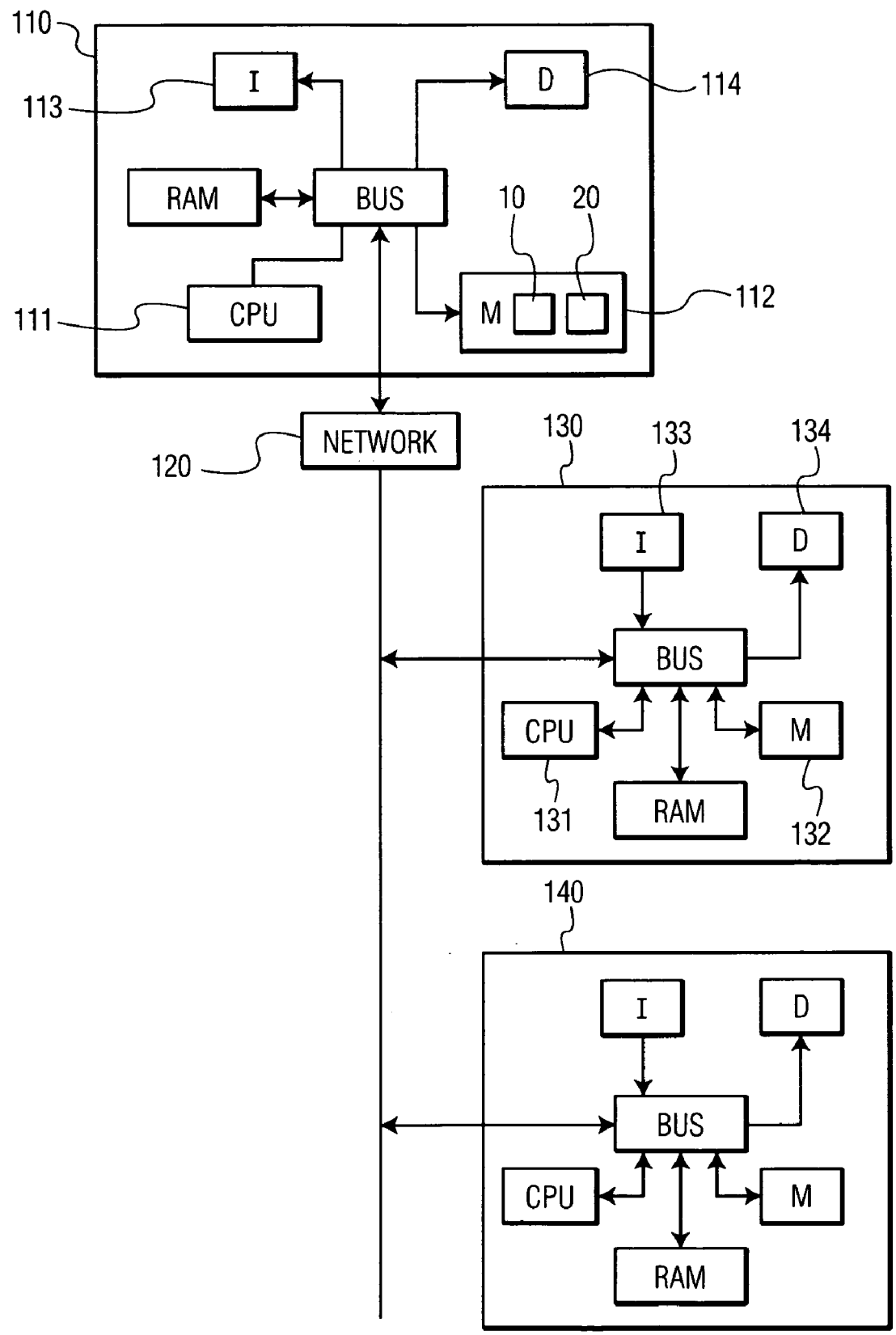
FIG. 1 is a block diagram of a communication network for a system for promoting agenda awareness in a communications client according to an exemplary embodiment of the present invention.

An exemplary embodiment of a system 100 for promoting agenda awareness in a communication client is shown in FIG. 1. The system, resides on a communication client 110. The following description is directed to an e-mail network with personal computers (PCs) as the communication clients. It should be understood, however, that the network may also be another type of communication network, such as instant messaging, and other types of networked devices, such as mobile phones, personal digital assistants (PDAs) and the like may be used as communication clients within the scope of the invention.

The communication client device 110 is connected to a network 120. In the illustrated example it is connected through a data bus connected to an Ethernet cable or the like, however, the connection may also be through an antenna or other means of network connection. The communication client comprises a processing unit 111 that executes an agenda awareness program 10 stored in a memory unit 112 to manage and update a contact list 20 stored in the memory unit 112 to promote agenda awareness. Contact information may be entered and/or changed through an input device 113, such as a keyboard or mouse or the like. Current contact and agenda information is presented at a display 114.

Figure 2:
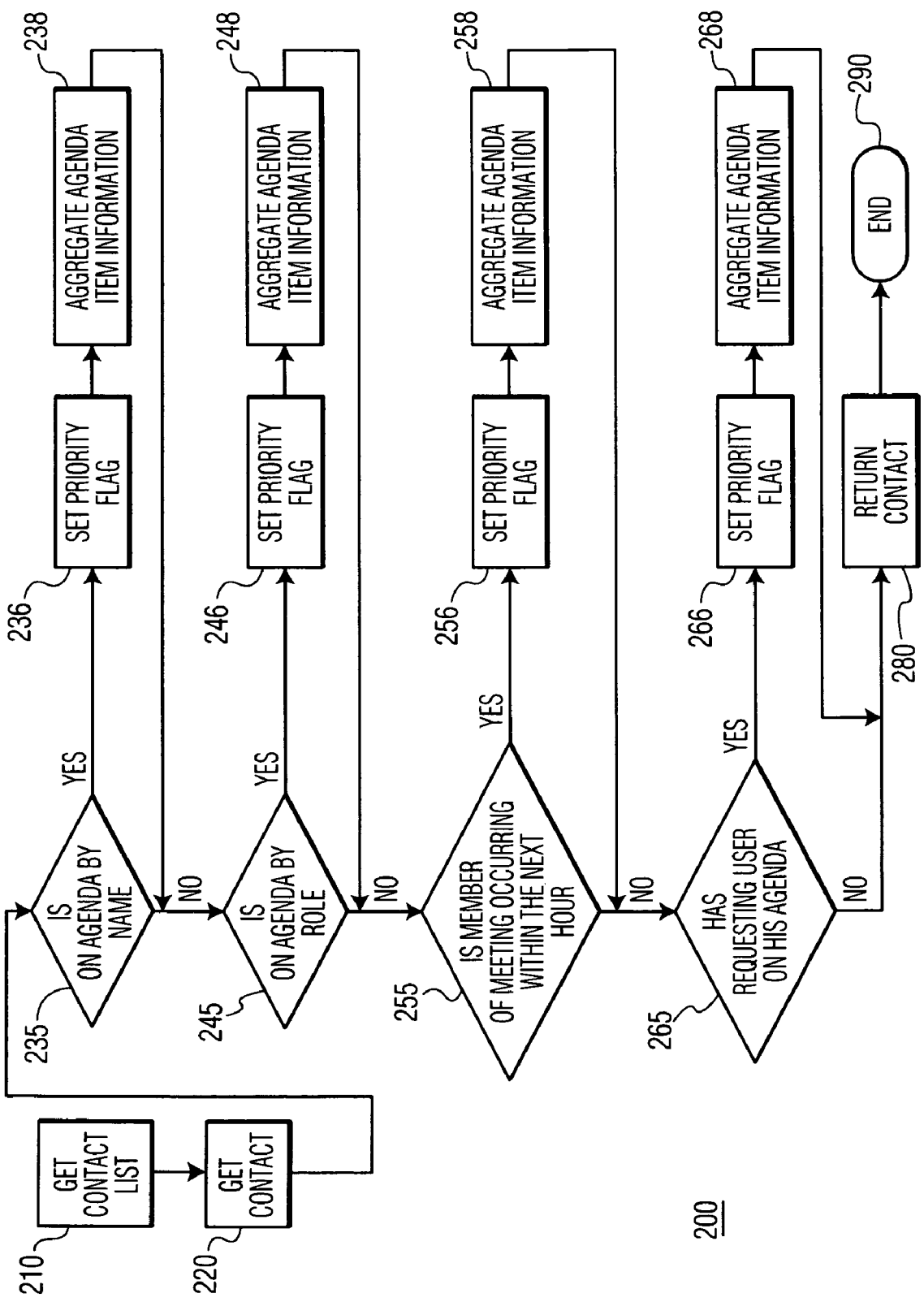
FIG. 2 is a flow diagram of a process for promoting agenda awareness in a communications client according to an exemplary embodiment of the present invention.

In an exemplary embodiment illustrated in FIG. 2, the agenda awareness program 10 retrieves a contact list 20 (step 210). The agenda awareness program 10 then retrieves a selected contact from the contact list 20 (step 220). Then the agenda awareness program 10 performs a reverse look-up to compare the selected contact to a client user's agenda, such as a personal calendar or todo list. In the reverse look-up steps, rather than looking up a contact name as in a typical look-up function, the agenda awareness program 10 starts with a selected contact, and looks for that contact in an agenda of collaborative tasks. For example, the agenda awareness program 10 might look for the selected name on an agenda by name (step 235).

In the illustrated embodiment, the agenda awareness program 10 queries against a remote data source for the selected contact. This remote source may be any of a variety of external tools for scheduling or managing tasks. For example, the agenda awareness program 10 might query a personal calendar or a todo list. Alternatively, the agenda information may be retrieved from a remote data source and stored locally in memory unit 112 or RAM for use in searching for a selected contact.

In an exemplary embodiment, contact information may be read off of a local file on a file system, such as todo.xml. This file may be formatted, for example like:

<todos>

<todo>Talk to Bob about defects</todo>

</todos>

In this example, the agenda awareness program 10 scans the content of each todo for an occurrence of a selected contact name. Optionally, the communication client may use a contact list with extended information (e.g., meta data) about the contact to look for the contact's full name, nicknames, functional group, and the like. Then, the agenda awareness program scans the content of each todo for an occurrence of a selected name or a match with the extended information for the selected contact.

Step 235 may be understood by reference to an exemplary case. Consider the case where a system user wishes to talk to a contact named Alex about array code. In this case, Alex is a contact on the user's contact list in a particular communication client, such as e-mail. The system user has entered Alex/array code on his to-do list. The agenda awareness program 10, resident on the communication client, retrieves the contact information and link for Alex from a contact list. Then, the agenda awareness program 10 does a reverse look-up of an agenda, in this case the to-do list for entries for Alex.

If the agenda awareness program 10 finds the selected contact (e.g., Alex) on the agenda by name, the agenda awareness program 10 sets a priority flag on the contact information and link for the selected contact (step 236) and aggregates the agenda item information (step 238). In this case, Alex/array code has been entered on the todo list, and therefore, a priority flag is set on the contact entry for Alex in the communication client user's contact list (step 236), and the agenda item (array code) is aggregated for the contact (Alex).

In an exemplary embodiment, the selected contact is used for a reverse look-up for agenda items by a role assigned to the contact (step 245). This step assumes that a contact list in a communication client has the ability to associate a role with a contact. Thus, a selected contact may include one or more roles associated with that contact, such as in meta data.

For example, a contact list has five contact listings for people who are members of a sales team, and the contact entries are flagged with the role "sales" in the contact list. A todo contains the information "talk to sales about X". The agenda awareness program 10 on the communication client scans the todo and finds the information "sales" which matches with a selected contact flagged with the role "sales" and the a priority flag is set for the selected contact.

In another illustrative example, a client user might have an agenda item requiring collaboration with a portal expert. If one of the contacts in the system user's contact list includes meta data identifying that contact as a portal expert, then the agenda awareness program 10 will set a priority flag on that contact (step 246) and aggregate the agenda item information (step 248).

In another exemplary embodiment, the selected contact is used for a reverse look-up for agenda items by approaching scheduled meetings (step 255). It may be desirable for a variety of reasons to communicate with another entity with whom one is about to attend a meeting. For example, it might be helpful to plan strategy with a co-worker on how to present new information. It might also be helpful to coordinate other tasks with an approaching meeting. For example, one might be scheduled to meet with a co-worker about one issue, and have a second, unrelated issue requiring information from the same co-worker. Therefore, it might be advantageous to communicate the need for information so that it may be provided in conjunction with the approaching meeting. If the selected contact is a member of an approaching meeting, the agenda awareness program 10 sets a priority flag on that contact (step 256) and aggregate the agenda item information (step 248).

In yet another exemplary embodiment, the selected contact may be used for a reverse look-up of entities that have requested communication with the client user (step 265). Consider the case of Charley's instant messenger (IM) client listing Bob, another IM client user, as someone that should be collaborated with. Typically, when an IM client is launched it requests the status of each contact on an IM contact list. When Bob's IM client requests the status of Charley, an indicator is sent over the IM channel from Charley's IM client to Bob's IM client indicating that Charley is looking for Bob. If an indicator is applied to the selected contact, then a priority flag is set for that contact (step 266) and aggregate the agenda item information (step 268).

It should be understood that any of the foregoing searches may be performed individually or in any combination. Moreover the agenda item searches described above are exemplary, and other agenda item searches are also contemplated within the scope of the invention.

Following completion of the defined agenda item searches (steps 235, 245, 255, 265), the agenda awareness program 10 returns the contact (step 280). The agenda awareness program 10 may then retrieve the next contact from a contact list (step 210) and repeats the search and flag setting steps described above for the new contact. Upon completion of the search and flag setting steps for each contact in the contact list, the agenda awareness program 10 ends the prioritizing process (step 290). The prioritizing process is performed on a periodic schedule, which may be set or may be chosen by the communication client user.

It should be understood that the foregoing explanation is exemplary, and the search steps need not be a reverse look-up with each contact in a contact list being individually selected and a search being made for agenda items with associated contact information matching the selected contact. The search may alternatively be performed in a forward direction. In this case each agenda item with associated contact information would be individually selected and the contact list in the communication client would be searched for contacts matching the associated contact information.

Figure 3:
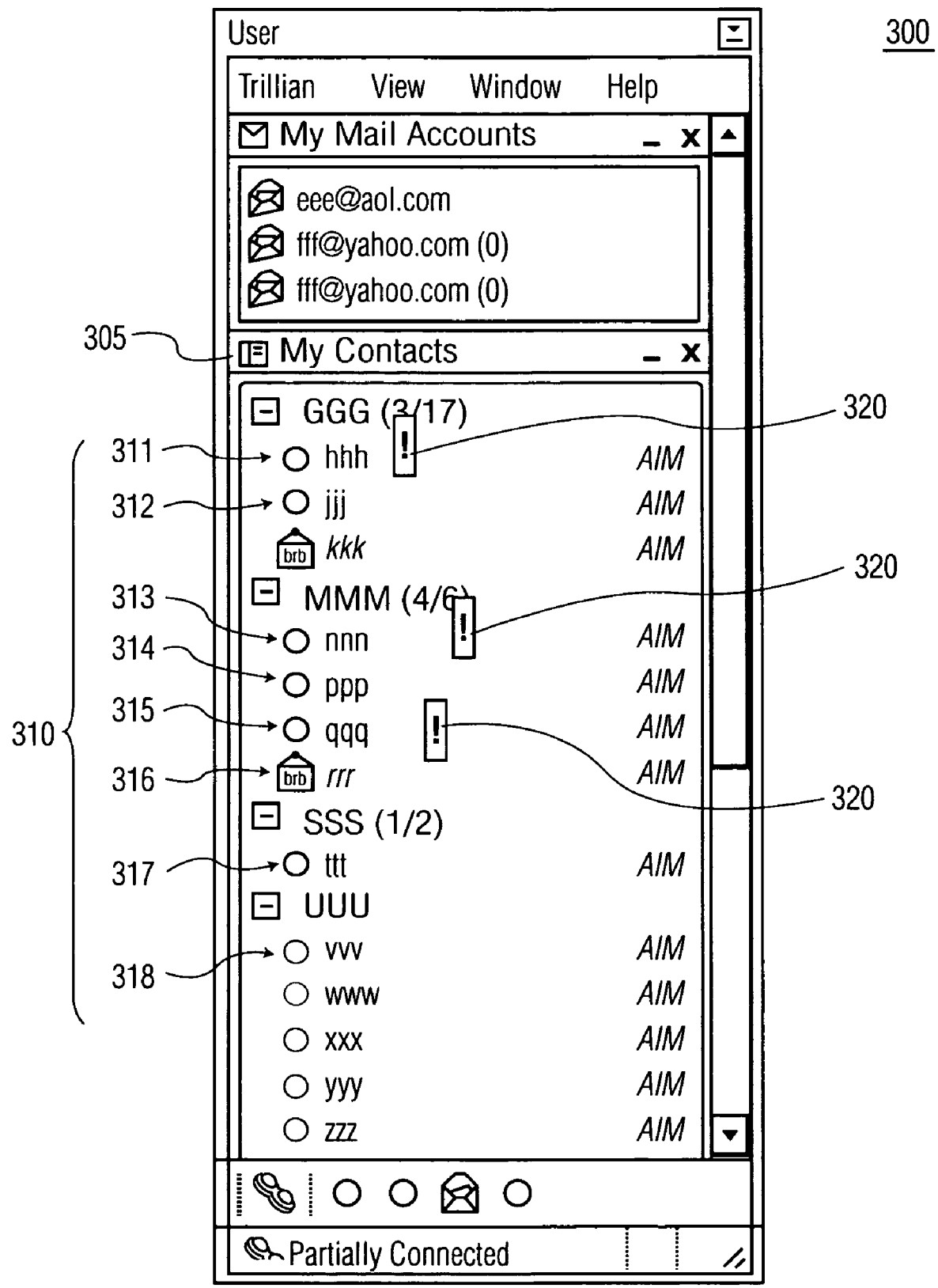
FIG. 3 shows a communications client interface presentation for a process for promoting agenda awareness in a communication client according to an exemplary embodiment of the present invention.

FIG. 3 shows a communications client interface presentation providing agenda awareness according to an exemplary embodiment of the present invention. The client interface presentation 300 comprises a contact list 305. Individual contacts 310 are listed according to a user defined format. In the illustrated example, contacts 311, 313, and 315 have a priority flag 320 set on them. Thus, contact 311 (hhh) is a contact with whom collaboration on an agenda item is desired. Similarly, contact 313 (nnn) is also a contact with whom collaboration on an agenda item is desired.

In this embodiment, agenda item details maybe displayed by one of various actions, such as hovering on a contact with a priority flag or by depressing a right button on a mouse (right clicking) while the mouse indicator is on the desired contact with a priority flag 320. In an exemplary embodiment, different priority flags are used for different types of agenda items (not shown).

Figure 4:
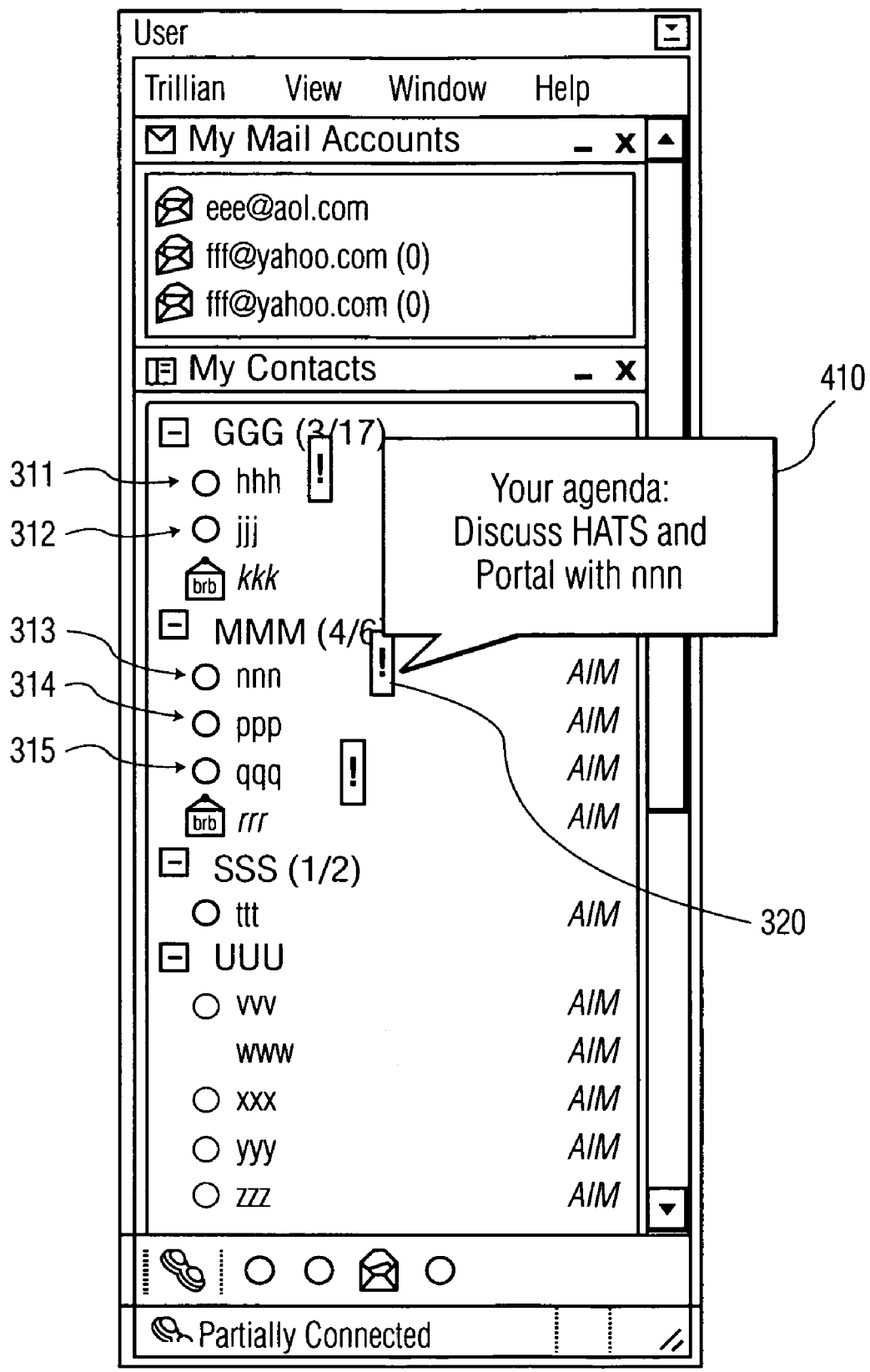
FIG. 4 shows another communications client interface presentation for a process for promoting agenda awareness according to an exemplary embodiment of the present invention displaying agenda details.

FIG. 4 shows another communications client interface presentation providing agenda awareness displaying agenda details according to an exemplary embodiment of the present invention. As described above, agenda item details 410 are presented on the user interface presentation by performing a particular action. In the illustrated example of FIG. 4, contact 313 (nnn) has a priority flag 320. The particular action (e.g., right clicking) was performed, and agenda details 410 are presented for contact 313. In this example, the agenda item was a discussion of HATS and Portal with nnn (contact 313).

Figure 5:
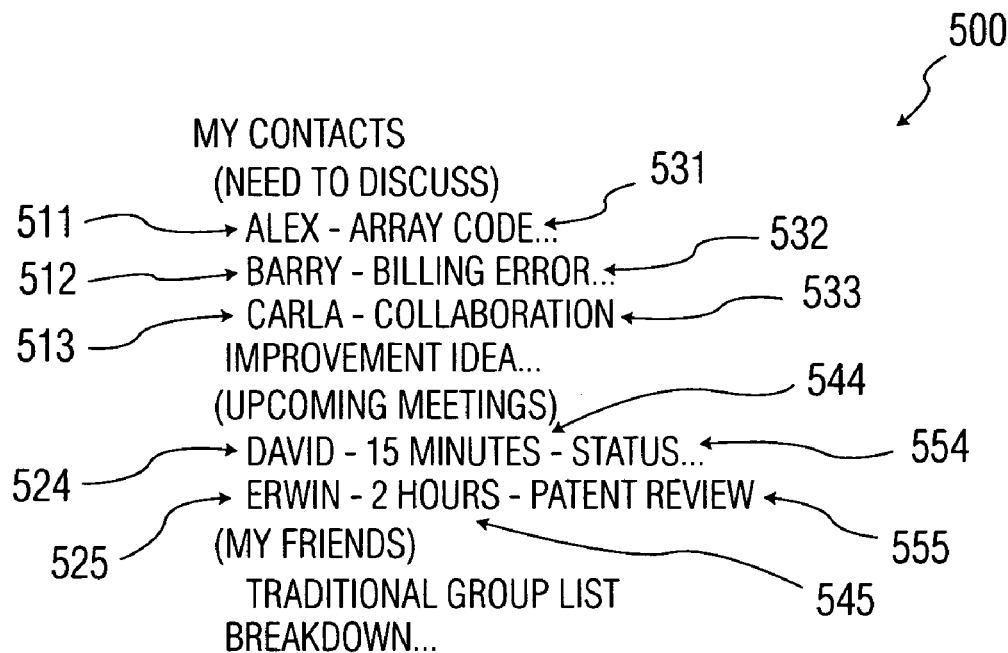
FIG. 5 shows yet another communications client interface presentation for a process for promoting agenda awareness according to an alternate exemplary embodiment of the present invention.

FIG. 5 shows yet another communication client interface presentation 500 providing agenda awareness according to an alternate exemplary embodiment of the present invention. In this embodiment, contacts with associated tasks 511, 512, 513, 524, 525 are segregated by task type. Thus, contacts with whom discussions are required 511-513 are segregated. Optionally a heading such as (NEED TO DISCUSS) may be used for this segregated sub-list of contacts, as shown in FIG. 5. A brief description of the discussion point 531, 532, 533 may be presented with each contact 511, 512, 513 in the discussion needed sub-list. Thus in the illustrated example, the communication client user can easily determine from his/her contact list in the communication client that he/she needs to contact: Alex to discuss array code, Barry to discuss a billing error, and Carla to discuss a collaboration improvement idea. It should be understood that the discussion point details 531, 532, 533 could also be hidden in a normal view of the contact list and presented by hovering or right clicking on the contact.

In the embodiment illustrated in FIG. 5, another sub-list of contacts 524, 525 with whom approaching meetings are scheduled is also segregated. This sub-list is optionally segregated under a heading, such as UPCOMING MEETINGS. The time remaining before the meeting 544, 545 and the subject of the meeting 554, 555 may be presented with the contact 524, 525. Thus, in the illustrated example, the communication client user can easily determine from his/her contact list in the communication client that he/she is scheduled to meet: with David in 15 minutes to address status, and with Erwin in 2 hours for a patent review.

Figure 6:
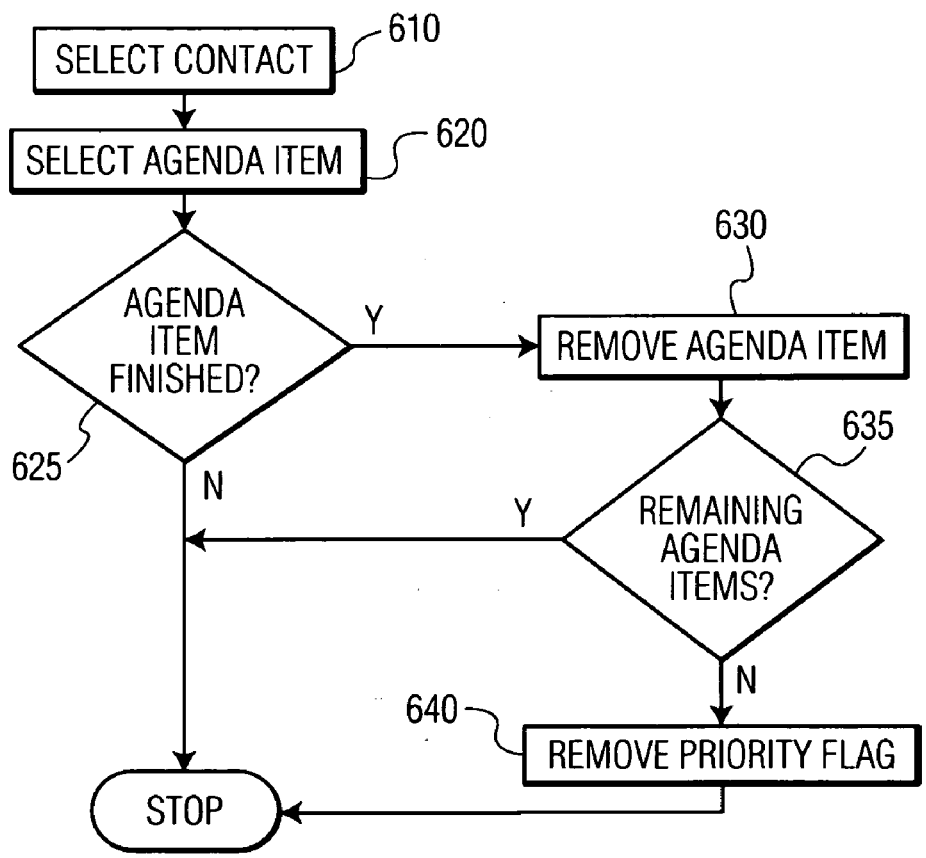
FIG. 6 is a flow diagram showing a process for removing a priority flag from a contact in a process for creating agenda awareness in a communications client according to an exemplary embodiment of the present invention.

FIG. 6 is a flow diagram showing a process for removing an agenda item from a contact in a process for creating agenda awareness in a communications client according to an exemplary embodiment of the present invention. Upon completion of the collaborative task associated with a contact in a communication client contact list, it is desirable to remove that agenda item or task from the contact list. This may be accomplished in various ways. For example, a communication client user may select a contact from the contact list (step 610) after completing a collaborative task with that contact. The selection (step 610) may open a dialog box which presents an aggregation of tasks associated with that contact and query whether any task is completed (step 625). The communication client user selects the desired task (step 620) and chooses an action indicating task completion (step 625). The agenda awareness program 10 then removes the agenda item from the contact (step 630).

After an agenda item is removed (step 630), the agenda awareness program 10 determines whether or not any tasks remain associated with the selected contact (step 635). If there are tasks remaining, then the process stops (step 650). If there are no tasks remaining for the selected contact, then the priority flag is removed from the selected contact (step 640), and the process stops (step 650).

If the agenda item is not completed, the communication client user selects no or takes a negative action in step 625, and the process stops. The negative action may be, for example, refraining from selecting a checkbox for agenda item complete.

Alternatively, a communication client user may remove an agenda item from a contact list during the communication session. In an exemplary embodiment, as shown in FIG. 6 and described below, during a communication session, a window or dialog box showing all agenda items for the contact with whom the communication session is being held. During the session, a communication client user selects the agenda item that is completed during the session (step 620, 625). The agenda awareness program 10 then removes the completed agenda item from the aggregation of agenda items for that contact (step 630).

After removing the completed agenda item, the agenda awareness program 10 determines whether or not any agenda items are still associated with the current contact (step 635). If there are no agenda items associated with the contact, then the priority flag is removed from the contact (step 640). If there are agenda items remaining, the process stops (step 650).

Figure 7:
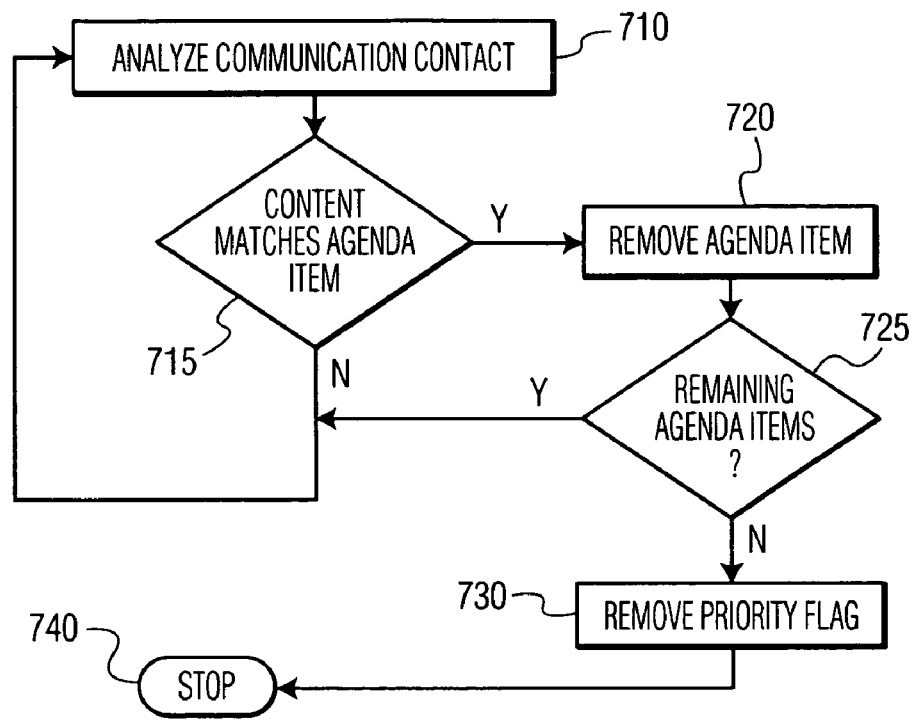
FIG. 7 is a flow diagram showing another process for removing an agenda item from a contact in a process for creating agenda awareness in a communications client according to an exemplary embodiment of the present invention.

FIG. 7 is a flow diagram showing a process for automatically removing an agenda item from a contact based on content analysis in a process for creating agenda awareness in a communications client according to an exemplary embodiment of the present invention. During a communication session, the agenda awareness program 10 analyzes the communication (step 710). The communication content is compared to agenda items for the current contact (step 715). If the content of the communication matches an agenda item for the current contact, then the agenda item is removed from the contact (step 720). If the content of the communication does not match an agenda item for the current contact, then the agenda awareness program 10 continues to analyze the communication content.

In an exemplary embodiment, the content of a todo is captured, and the articles and other common words are stripped out. The agenda awareness program 10 then compares the remaining words of the todo with the current conversation's transcript. If the percentage of remaining words that appear in the transcript exceeds a threshold value, such as 75%, for instance, then the agenda awareness program 10 recognizes a possibility that the todo has been addressed. It should be understood that alternative and possibly more advanced analysis may be performed to match the agenda item content with a communication.

After an agenda item is removed (step 720), the agenda awareness program 10 checks for remaining agenda items (step 725). If there are no remaining agenda items for the current contact, then the agenda awareness program 10 removes the priority flag from the contact (step 730), and the agenda awareness program 10 stops (step 740).

The automatic removal of an agenda item is illustrated by the following example. In an exemplary case, Alex is on a communication client's agenda for a question about array code. A priority flag has therefore been set for Alex, and Alex and array code have been aggregated fir the contact, Alex. During a communication session with Alex, the term "array code" is communicated between the communication client user and Alex. The agenda awareness program 10 analyzes the communication client and matches the content "array code" with the agenda item "array code" and removes or deletes the agenda item "array code". If "array code" is the only agenda item for Alex, then the agenda awareness program 10 removes the priority flag from the entry, Alex in the contact list.

Figure 8:
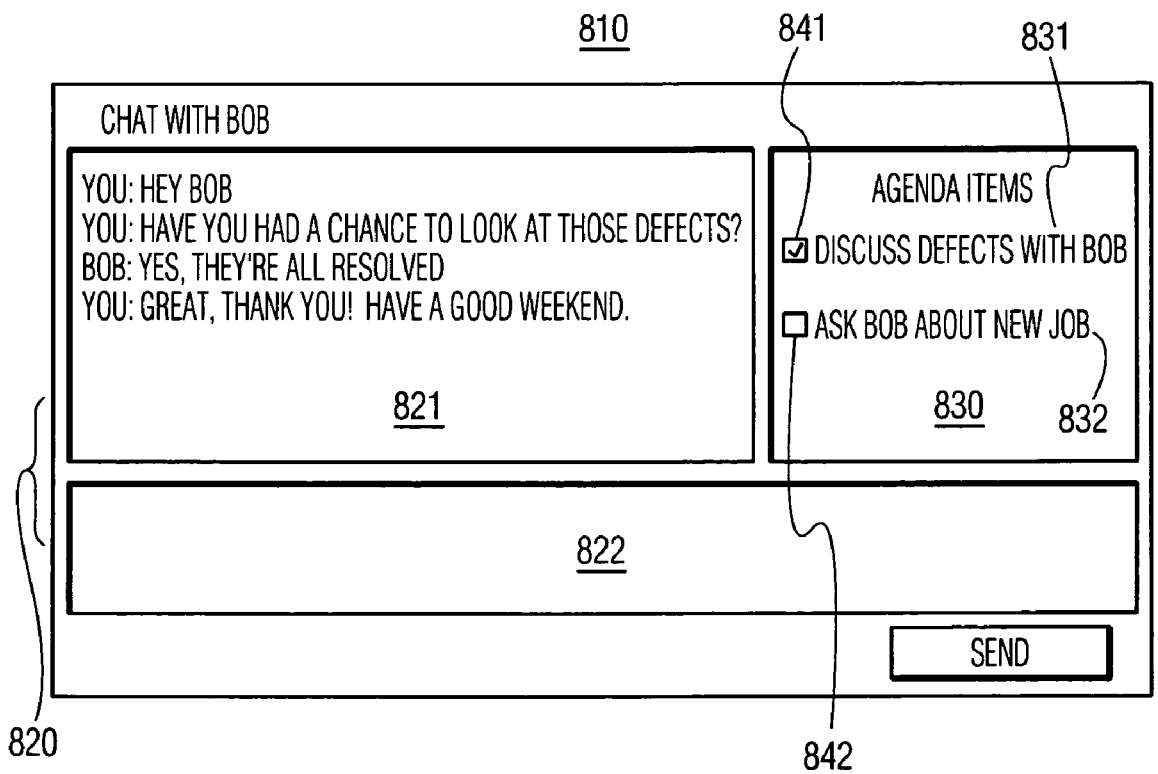
FIG. 8 shows a communications client interface presentation used for removing an agenda item from a contact in a process for providing agenda awareness in a communication client according to an alternate exemplary embodiment of the present invention.

FIG. 8 shows a communications client interface presentation 810 for removing an agenda item from a contact in a process for providing agenda awareness in a communication client according to an alternate exemplary embodiment of the present invention. During a communication session with a contact listed in a communication client user's contact list, communication content is presented in one or more communication windows 820. In the illustrated example, a first communication window 821 shows an IM chat. A second communication window 822 shows a message prepared by the communication client user and not yet sent.

In an agenda window 830, agenda items 831, 832 are presented for collaboration with the current contact. In an exemplary embodiment, the agenda items may be removed from this interface presentation by selecting a corresponding checkbox 841, 842 for the agenda item 831, 832 that is completed. It should be understood that other forms of indicating a particular agenda item are also contemplated.

In the illustrated example, an IM chat is occurring with a contact named BOB. The communication client user has two agenda items for collaboration with BOB, specifically: DISCUSS DEFECTS WITH BOB 831 and ASK BOB ABOUT NEW JOB 832. As can be seen from the message content in the first communication window 821, defects have been discussed with BOB and are resolved. Accordingly, the communication client user has selected the checkbox 841 corresponding to DISCUSS DEFECTS WITH BOB 831.

The agenda window 830 is useful as a discussion template, reminding the communication client user of agenda items for collaboration with a current contact. The agenda window 830 is also useful for removing completed agenda items from a contact list in the communication client.

Although illustrated and described above with reference to certain specific embodiments, the present invention is nevertheless not intended to be limited to the details shown. Rather, various modifications may be made in details within the scope and range of equivalents of the claims and without departing from the spirit of the invention.

What is claimed is:

1. A computer-implemented method for promoting agenda awareness in a communication client, said method comprising the steps of:
   providing a system user's agenda of tasks including respective associated contact information to the communication client;
   searching for matches of the associated contact information from the agenda to a contact in a contact list in the communication client; and
   presenting contacts matching the associated contact information and the tasks associated with the contact information at a user interface.

2. The method of claim 1, wherein the search for matches comprises searching for matches of open discussion items in the task descriptions in the agenda of tasks to a contact in the contact list.

3. The method of claim 1, wherein the search for matches comprises searching for matches of an approaching due date in the task descriptions in the agenda of tasks to a contact in the contact list.

4. The method of claim 1, wherein the search for matches comprises searching for matches of a recently passed due date in the task descriptions in the agenda of tasks to a contact in the contact list.

5. The method of claim 1, wherein the search for matches comprises searching for matches of a newly undertaken task in the task descriptions in the agenda of tasks to a contact in the contact list.

6. The method of claim 1, wherein the search for matches comprises searching for matches of a recently completed task in the task descriptions in the agenda of tasks to a contact in the contact list.

7. The method of claim 1, wherein the search for matches comprises searching for matches of a recently delegated task in the task descriptions in the agenda of tasks to a contact in the contact list.

8. The method of claim 1, wherein the search for matches comprises searching for matches of a newly proposed task in the task descriptions in the agenda of tasks in conflict with an existing task commitment to a contact in the contact list.

9. The method of claim 1, wherein the associated contact information is a name of an individual associated with a task.

10. The method of claim 1, wherein the associated contact information is a role of an individual associated with a task.

11. The method of claim 1, wherein the associated contact information is a name of an individual attempting to contact the system user.

12. The method of claim 1, further comprising the steps of:
   enabling a communication client user to mark a task completed from the communication session.

13. The method of claim 1, further comprising the step of:
   automatically marking a task completed from a communication session based on content analysis of the communication session.

14. The method of claim 1, wherein the step of providing a system user's agenda of tasks with associated contact information to the communication client comprises retrieving agenda information from a remote data source while searching for matches with a selected contact.

15. The method of claim 1, wherein contacts matching the associated contact information are presented segregated by task type.

16. The method of claim 1, wherein contacts matching the associated contact information are presented with a priority flag.

17. A program product comprising a computer-readable storage medium having computer-readable program code embedded thereon for managing response requested messages, said program product comprising:
- computer-readable program code for providing a system user's agenda of tasks including respective associated contact information to the communication client;
- computer-readable program code for searching for matches of the associated contact information from the agenda to a contact in a contact list in the communication client; and
- computer-readable program code for presenting contacts matching the associated contact information and the tasks associated with the contact information at a user interface.

18. The program product of claim 17, further comprising:
computer-readable program code for enabling a communication client user to mark a task completed from the communication session.

19. The program product of claim 17, further comprising:
computer-readable program code for automatically marking a task completed from a communication session based on content analysis of the communication session.

20. The program product of claim 17, wherein the program product is a data storage media.

21. A system for promoting agenda awareness in a communication client, said system comprising a networked communication client having:
- a processing unit executing code,
- a memory unit for storing a user's agenda of tasks and contact list, and
- a display for presenting the user's contact list;
- wherein the processing unit executes code from the memory unit to search for matches of the associated contact information from the agenda to a contact in a contact list, and presents contacts matching the associated contact information and the tasks associated with the contact information at the display.

* * * * *